United States Patent
Otaka

(10) Patent No.: US 11,109,296 B2
(45) Date of Patent: Aug. 31, 2021

(54) CONTROL DEVICE, COMPUTER-READABLE STORAGE MEDIUM, COMMUNICATION SYSTEM, AND CONTROL METHOD

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/886,809

(22) Filed: May 29, 2020

(65) Prior Publication Data
US 2020/0389832 A1    Dec. 10, 2020

(30) Foreign Application Priority Data

Jun. 5, 2019    (JP) .............................. JP2019-105479

(51) Int. Cl.
*H04W 36/00*    (2009.01)
*H04W 36/34*    (2009.01)
*H04W 88/04*    (2009.01)

(52) U.S. Cl.
CPC .......... *H04W 36/34* (2013.01); *H04W 88/04* (2013.01)

(58) Field of Classification Search
CPC ..... H04W 36/34; H04W 88/04; H04W 88/02; H04M 1/72519; H04M 1/72522
USPC ..................... 455/437, 550.1, 11.1; 370/331
See application file for complete search history.

(56) References Cited

U.S. PATENT DOCUMENTS

| | | | |
|---|---|---|---|
| 8,948,006 B2 * | 2/2015 | Taneja | H04W 28/0268 370/229 |
| 10,051,543 B2 * | 8/2018 | Hans | H04W 36/0005 |
| 2010/0056161 A1 * | 3/2010 | Matsumura | H04W 28/18 455/445 |
| 2011/0021221 A1 | 1/2011 | Kondo | |
| 2011/0195699 A1 * | 8/2011 | Tadayon | H04W 4/029 455/418 |
| 2013/0244569 A1 * | 9/2013 | Dunn | H04W 36/0061 455/11.1 |
| 2014/0254472 A1 * | 9/2014 | Wang | H04B 7/14 370/315 |
| 2018/0092096 A1 * | 3/2018 | Yokoyama | H04B 7/155 |
| 2020/0027352 A1 * | 1/2020 | Yoo | B60W 40/02 |
| 2020/0358832 A1 * | 11/2020 | Perreault | H04L 65/608 |

FOREIGN PATENT DOCUMENTS

JP    2011029988 A    2/2011

* cited by examiner

*Primary Examiner* — Danh C Le

(57) ABSTRACT

A control device is provided, including: a relative-speed acquiring unit for acquiring relative speeds of a movable first mobile relaying apparatus and a movable second mobile relaying apparatus, which are camped on a cell of a wireless base station to relay communications between the wireless base station and a wireless communication terminal; and a determination unit for determining, based on the relative speeds, whether the second mobile relaying apparatus becomes a handover destination, from the first mobile relaying apparatus, of the wireless communication terminal camped on the first mobile relaying apparatus, or becomes a carrier-aggregation destination of the first mobile relaying apparatus for the wireless communication terminal camped on the first mobile relaying apparatus.

12 Claims, 9 Drawing Sheets

CONTROL DEVICE, COMPUTER-READABLE STORAGE MEDIUM, COMMUNICATION SYSTEM, AND CONTROL METHOD

The contents of the following Japanese patent application are incorporated herein by reference: NO. 2019-105479 filed in JP on Jun. 5, 2019

BACKGROUND

1. Technical Field

The present invention relates to a control device, a computer-readable storage medium, a communication system, and a control method.

2. Related Art

A mobile relaying apparatus that functions as a base station and movable has been known (for example, refer to Patent Literature 1).

PRIOR ART LITERATURE

Patent Literature

[Patent Literature 1] Japanese Unexamined Patent Application Publication No. 2011-029988

DISCLOSURE OF THE INVENTION

Technical Problem

Preferably, a technique capable of selecting another mobile relaying apparatus suitable for a handover destination or a carrier-aggregation destination of a wireless communication terminal camped on the mobile relaying apparatus is provided.

DESCRIPTION OF EXEMPLARY EMBODIMENTS

The following describes the present invention through embodiments of the invention, and the below described embodiments do not limit the scope of the invention according to the claims. In addition, not all combinations of features described in the embodiments are necessarily essential to the solution of the invention.

Figure 1:
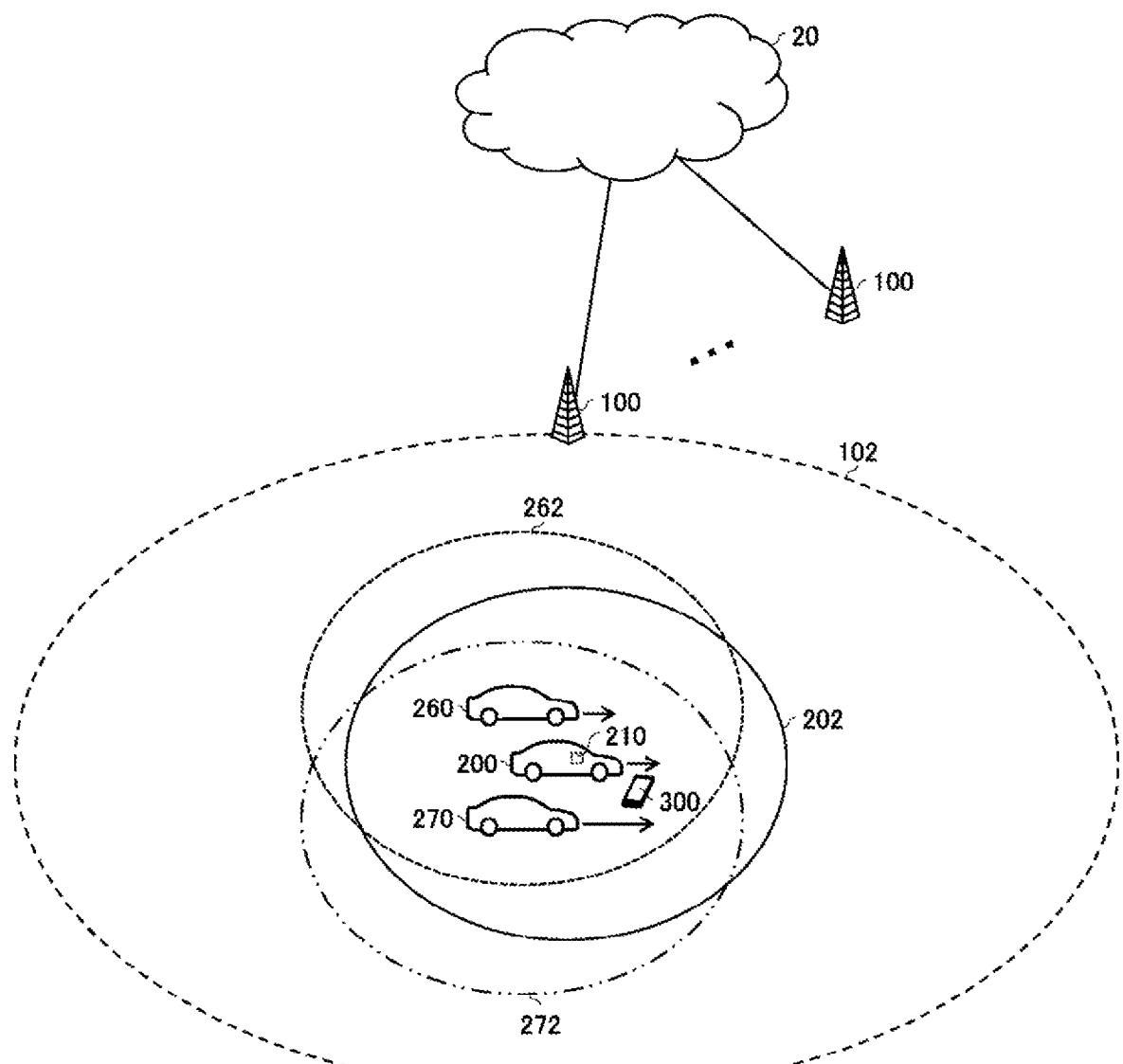
FIG. 1 schematically illustrates an example of a communication system 10.

FIG. 1 schematically illustrates an example of a communication system 10. The communication system 10 includes a vehicle 200. The communication system 10 may include a wireless communication terminal 300. The communication system 10 may include a wireless base station 100.

The vehicle 200 is camped on a cell 102 of the wireless base station 100 and has a relay function of relaying communications between the wireless base station 100 and the wireless communication terminal 300. The cell 102 indicates an area in which wireless communications with the wireless base station 100 are enabled. That the vehicle 200 is camped on the cell 102 of the wireless base station 100 may be that the vehicle 200 is located in the cell 102 of the wireless base station 100 to establish a wireless communication connection with the wireless base station 100. That the vehicle 200 is camped on the cell 102 of the wireless base station 100 may be described as that the vehicle 200 is camped on the wireless base station 100. The vehicle 200 may be an example of a mobile relaying apparatus. An in-vehicle device 210 mounted in the vehicle 200 may be an example of a control device.

The vehicle 200 may be an automobile. The vehicle 200 may be any type of automobile, as long as it has a wireless communication function. For example, the vehicle 200 may be a gasoline-fueled vehicle, or may be a so-called eco-friendly vehicle. The types of the eco-friendly vehicle include HV (Hybrid Vehicle), PHEV/PHV (Plug-in Hybrid Vehicle), EV (Electric Vehicle), FCV (Fuel Cell Vehicle), and the like. The vehicle 200 may be an automobile for any use. For example, the vehicle 200 may be a private vehicle, or may be a commercial vehicle such as a taxi and a bus.

The wireless base station 100 may be compliant with any mobile communication method. The wireless base station 100 is compliant with, for example, the 3G (3rd Generation) communication method. The wireless base station 100 is compliant with, for example, the LTE (Long Term Evolution) communication method. The wireless base station 100 may be an eNB (eNodeB). In addition, the wireless base station 100 is compliant with, for example, the 5G (5th Generation) communication method. The wireless base station 100 may be a gNB (gNodeB). The wireless base station 100 may be compliant with a mobile communication method that is a 6G (6th Generation) communication method and beyond. Herein, a case in which the wireless base station 100 is compliant with the LTE communication method is mainly described as an example.

The wireless base station 100 is connected to a network 20. The network 20 includes a mobile communication network. The network 20 may include the internet.

The wireless communication terminal 300 may be any communication terminal, as long as it has a wireless communication function. The wireless communication terminal 300 is, for example, a mobile phone such as a smartphone, a tablet terminal, a wearable terminal, a PC (Personal Computer), and the like. The wireless communication terminal 300 may also be a so-called IoT (Internet of Thing) device.

For example, the vehicle 200 generates a cell 202, and performs wireless communications with a wireless communication terminal 300 camped on the cell 202. The cell 202 indicates an area in which wireless communications with the vehicle 200 are enabled. The cell 202 may be smaller than the cell 102. That the wireless communication terminal 300 is camped on the cell 202 of the vehicle 200 may be that the wireless communication terminal 300 is located in the cell 202 and establishes a wireless communication connection with the vehicle 200. That the wireless communication terminal 300 is camped on the cell 202 of the vehicle 200 may be described as that the wireless communication terminal 300 is camped on the vehicle 200.

A communication method of wireless communications between the vehicle 200 and the wireless communication terminal 300 may be the mobile communication method. The vehicle 200 may be referred to as a mobile base station. The mobile communication method between the vehicle 200 and the wireless communication terminal 300 may be the same as the mobile communication method between the vehicle 200 and the wireless base station 100. In addition, the mobile communication method between the vehicle 200 and the wireless communication terminal 300 may different from the mobile communication method between the vehicle 200 and the wireless base station 100.

A radio-frequency band that the vehicle 200 uses for wireless communications with the wireless communication terminal 300 may be a higher frequency band than a radio-frequency band that the wireless base station 100 uses for wireless communications with the wireless communication terminal 300. For example, the vehicle 200 can perform wireless communications with the wireless communication terminal 300 according to the 5G communication method, and the wireless base station 100 can perform wireless communication with the wireless communication terminal 300 according to the LTE communication method.

A radio-frequency band that the vehicle 200 uses for wireless communications with the wireless communication terminal 300 may be a lower frequency band than a radio-frequency band that the wireless base station 100 uses for wireless communications with the wireless communication terminal 300. For example, the vehicle 200 can perform wireless communications with the wireless communication terminal 300 according to the LTE communication method, and the wireless base station 100 can perform wireless communication with the wireless communication terminal 300 according to the 5G communication method.

The vehicle 200 may cooperate with another vehicle 200 to enable to provide the wireless communication terminal 300 with a wireless communication service. For example, the vehicle 200 cooperates with another vehicle 200 to provide the wireless communication terminal 300 with a wireless communication service for which the carrier-aggregation technology is utilized. Providing the wireless communication terminal 300 with a wireless communication service for which the carrier-aggregation technology is utilized may be described as providing the wireless communication terminal 300 with the carrier-aggregation.

In the conventional carrier-aggregation technology, for example, a wireless base station whose radio wave intensity received by the wireless communication terminal 300 is the strongest is selected as a carrier-aggregation destination of the first wireless base station for the wireless communication terminal 300 camped on the first wireless base station.

On the other hand, the vehicle 200 according to this embodiment selects another vehicle 200 in a carrier-aggregation destination, considering a relative speed to the own-vehicle. For example, the vehicle 200 according to this embodiment determines a vehicle 200, whose relative speed to the own-vehicle is slower among a plurality of other vehicles 200, as a carrier-aggregation destination. More specifically, the vehicle 200 determines another vehicle 200, whose relative speed to the own-vehicle is the slowest, as a carrier-aggregation destination.

Another vehicle 200, whose relative speed to the own-vehicle is faster, results in going away from the own-vehicle in a shorter time. Thus, for example, as before, when another vehicle 200 in the carrier-aggregation destination is selected based on the radio wave intensity received by the wireless communication terminal 300 without considering the relative speed, and when the own vehicle's relative speed to the another vehicle 200 is faster, the own-vehicle and the another vehicle 200 result in being separated with each other in a short time, thereby the communication quality is decreased earlier or a time period capable of providing the carrier-aggregation is shorter. On the other hand, in the vehicle 200 according to this embodiment, a vehicle 200, whose relative speed to the vehicle 200 is slower, is selected as a carrier-aggregation destination, so that the carrier-aggregation can be provided to the wireless communication terminal 300 across a longer time. In addition, to make the wireless communication service by the carrier-aggregation more stable is possible.

FIG. 1 illustrates a vehicle 260 and a vehicle 270, as an example of a plurality of other vehicles 200. The vehicle 260 and the vehicle 270 is proceeding in the same direction as the vehicle 200, and a relative speed between the vehicle 200 and the vehicle 260 is slower than a relative speed between the vehicle 200 and the vehicle 270. In this example, the vehicle 200 selects the vehicle 260 as a carrier-aggregation destination for the wireless communication terminal 300. This can provide the carrier-aggregation for the wireless communication terminal 300 for a longer time, compared with a case of selecting the vehicle 270 as a carrier-aggregation destination.

In addition, for example, the vehicle 200 according to this embodiment determines, as the carrier-aggregation destination, a vehicle 200 from which the wireless communication terminal 300 receives stronger radio wave intensity, among other vehicles 200 whose relative speeds to the own-vehicle are slower than the predetermined speed. This can achieve higher communication quality, while prevent providing time period of the carrier-aggregation from being too short.

The vehicle 200 according to this embodiment may have a function of selecting a vehicle 200 in a handover destination of the wireless communication terminal 300 camped on the own-vehicle, considering a relative speed to the own-vehicle. For example, the vehicle 200 performs control such that the wireless communication terminal 300 is handovered to a vehicle 200 whose relative speed to the own-vehicle is slower among a plurality of other vehicles 200. More specifically, the vehicle 200 performs control such that the wireless communication terminal 300 is handovered to another vehicle 200 whose relative speed to the own-vehicle is the slowest. This can achieve a stable handover, compared with a case that the wireless communication terminal 300 is handovered to another vehicle 200 whose relative speed to the own-vehicle is fast.

The vehicle 200 may perform control such that the wireless communication terminal 300 is handovered to a vehicle 200 whose relative speed to the own-vehicle is slower among other vehicles 200 whose moving speed is slower than the own-vehicle. When a handover to another vehicle 200 whose moving speed is slower than the own-vehicle is performed, compared with a case that handover to another vehicle 200 whose moving speed is faster than the own-vehicle is performed, a speed for the another vehicle 200 to separate from the wireless communication terminal 300 can be made to be slow. Thus, this can stabilize communications between the vehicle 200 and the wireless communication terminal 300 after the handover, while achieving a stable handover.

The vehicle 200 may perform control such that the wireless communication terminal 300 is handovered to another vehicle 200 whose relative speed to the own-vehicle is slower than the predetermined speed and whose relative speed to the wireless communication terminal 300 is slower than the predetermined speed. When the wireless communication terminal 300 is handovered to another vehicle 200 whose relative speed to the wireless communication terminal 300 is fast, the another vehicle 200 separates earlier from the wireless communication terminal 300 after the handover, so that communication quality is decreased earlier, or a communication connection time period is shorter. However, the vehicle 200 according to this embodiment can suppress an occurrence of such a thing.

Figure 2:
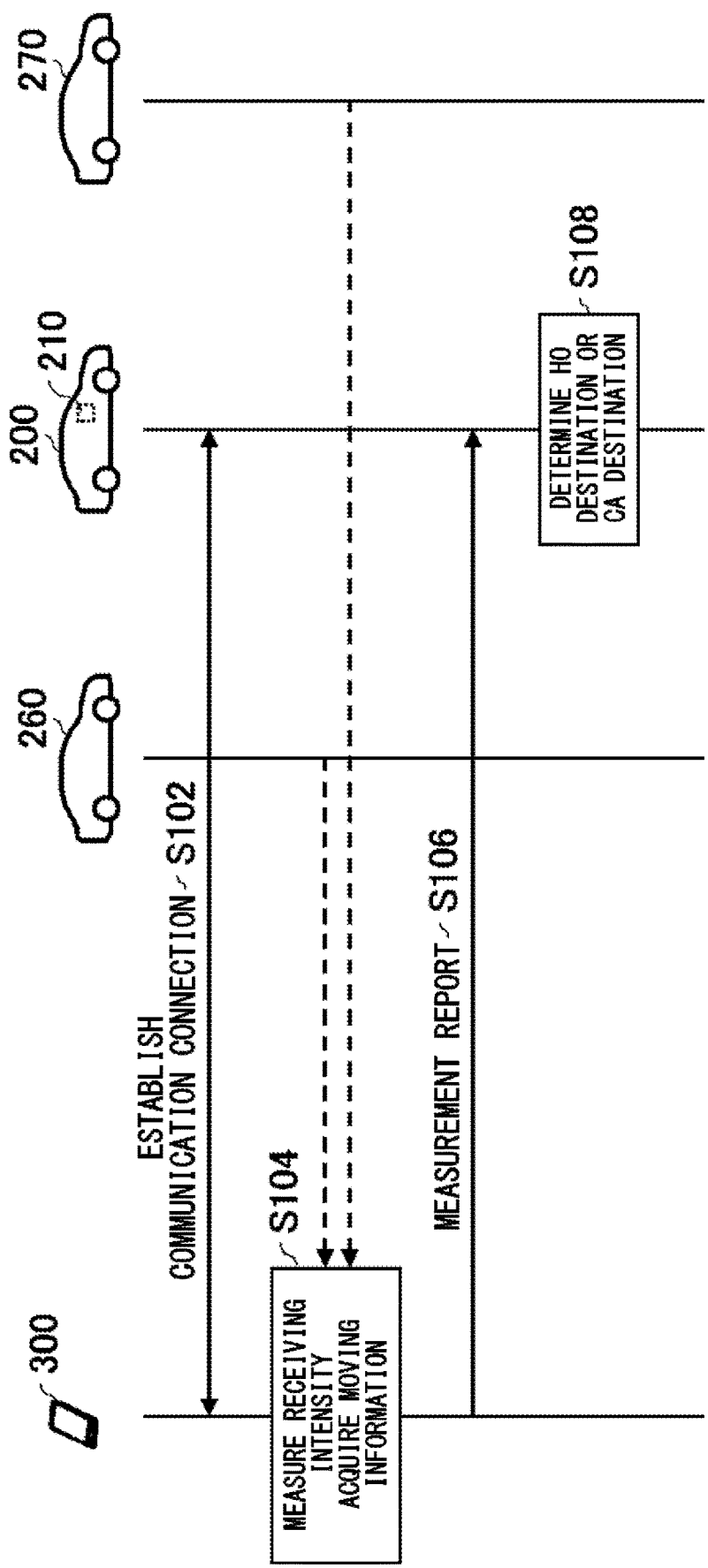
FIG. 2 schematically illustrates an example of a flow of processes performed by the communication system 10.

FIG. 2 schematically illustrates an example of a flow of processes performed by the communication system 10. Herein, a flow of processes described, from that wireless communication terminal 300 is camped on the vehicle 200 to that the vehicle 200 determines a handover (which may be described as HO) destination or a carrier-aggregation (which may be described as CA) destination for the wireless communication terminal 300.

FIG. 2 is described assuming a situation that the wireless communication terminal 300 is located in a cell 202 of a vehicle 200, a cell 262 of a vehicle 260, and a cell 272 of a vehicle 270, and that the vehicle 200, the vehicle 260, and the vehicle 270 are camped on the wireless base station 100. Processes by the vehicle 200 are mainly performed under a control of an in-vehicle device 210 that is an example of a control device.

At Step (the step may be abbreviated as "S") 102, the wireless communication terminal 300 and the vehicle 200 establish a communication connection. At S104, the wireless communication terminal 300 measures a received-radio-wave intensity and acquires moving information of a vehicle that is a source of the radio wave. The moving information may include a moving direction and a moving speed of the vehicle.

In the example illustrated in FIG. 2, the wireless communication terminal 300 receives the moving information of the vehicle 260 from the vehicle 260, and receives the moving information of the vehicle 270 from the vehicle 270. The vehicle 260 and the vehicle 270 periodically transmit broadcasting information, because each of the vehicles functions as a wireless base station. The broadcasting information typically includes PLMN (Public land mobile network), a band number, a cell ID, a wireless-related parameter, an emergency earthquake alert, and the like. The vehicle 260 and the vehicle 270 in the example illustrated in FIG. 2, however, further include the moving information into the broadcasting information and transmit the broadcasting information. The wireless communication terminal 300 may acquire the moving information included in the broadcasting information.

When the vehicle 260 and the vehicle 270 are compliant with the LTE communication method, the vehicle 260 and the vehicle 270 include, for example, a SIB (System Information Block) into the moving information.

When the vehicle 260 and the vehicle 270 are compliant with the 5G communication method, the vehicle 260 and the vehicle 270 include, for example, OSI (Other System Information) into the moving information. The vehicle 260 and the vehicle 270 may include MSI (Minimum System Information) into the moving information.

At S106, the wireless communication terminal 300 includes the moving information acquired at S104 into a measurement report of the received-radio-wave intensity measured at S104, to transmit the measurement report to the vehicle 200. The measurement report may be a predetermined message. The measurement report may be a so-called "Measurement Report".

At S108, the vehicle 200 determines an HO destination or a CA destination for the wireless communication terminal 300, based on the received-radio-wave intensity and the moving information included in the measurement report received at S106. The vehicle 200 determines, as an HO destination or a CA destination for the wireless communication terminal 300, for example, a vehicle whose relative speed to the own-vehicle is slower among vehicles of which the received-radio-wave intensity is stronger than a predetermined intensity. In the example illustrated in FIG. 2, the vehicle 200 determines, as an HO destination or a CA destination for the wireless communication terminal 300, a vehicle whose relative speed to the own-vehicle is slower in the vehicle 260 and the vehicle 270 of which the received-radio-wave intensity is stronger than a predetermined intensity.

Figure 3:
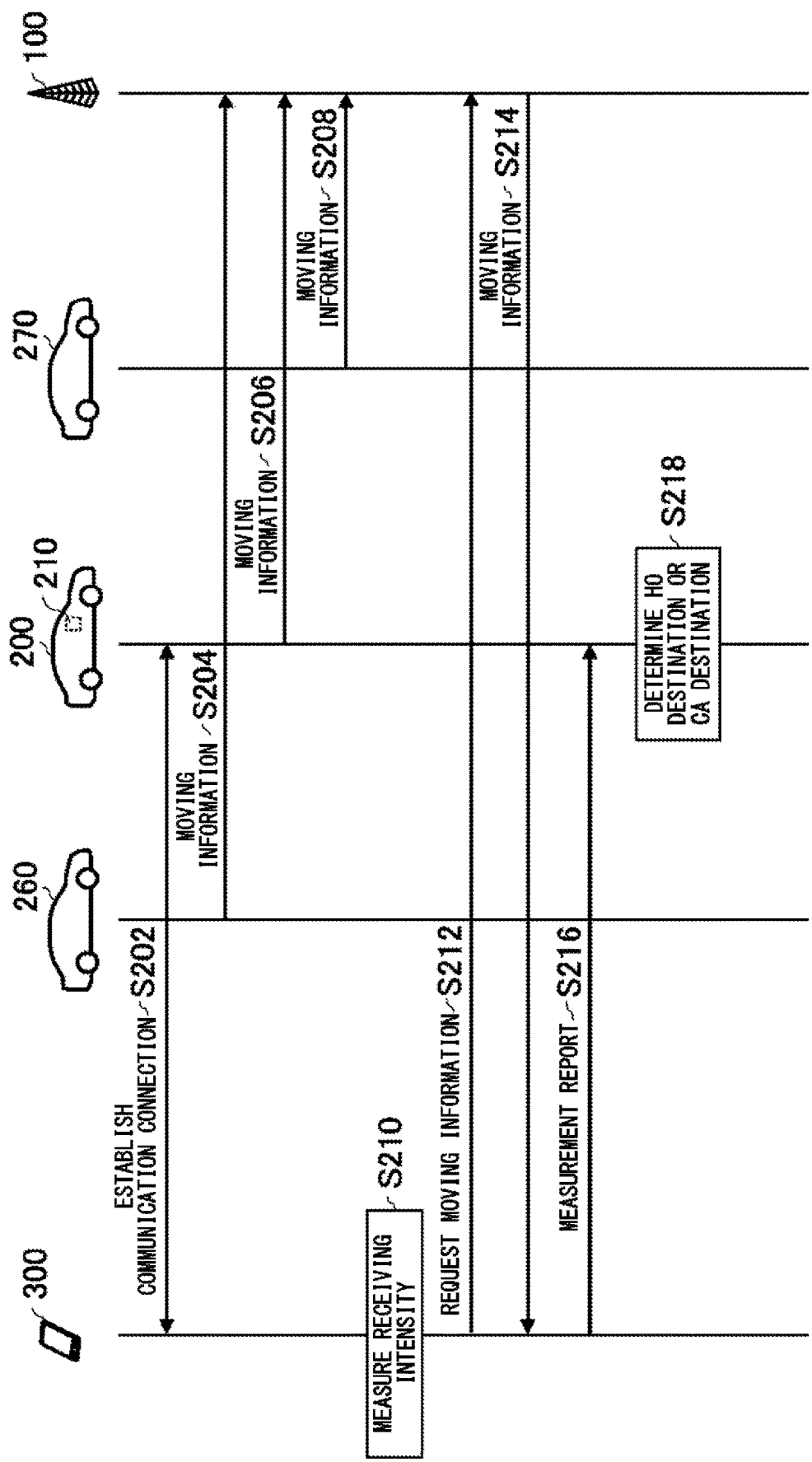
FIG. 3 schematically illustrates an example of a flow of processes performed by the communication system 10.

FIG. 3 schematically illustrates an example of a flow of processes performed by the communication system 10. Herein, different points from FIG. 2 are mainly described. In the example illustrated in FIG. 3, a vehicle 200, a vehicle 260, and a vehicle 270 camped on the wireless base station 100 intermittently transmit moving information to the wireless base station 100. To intermittently transmit may be to periodically transmit, or may be to transmit according to a predetermined schedule, or may be to transmit every time when a predetermined condition is satisfied.

At S202, the wireless communication terminal 300 and the wireless base station 100 establish a communication connection. At S204, the vehicle 260 transmits moving information of the vehicle 260 to the wireless base station 100. At S206, the vehicle 200 transmits moving information of the vehicle 200 to the wireless base station 100. At S208, the vehicle 270 transmits moving information of the vehicle 270 to the wireless base station 100.

At S210, the wireless communication terminal 300 performs a measurement of a received-radio-wave intensity. At S212, the wireless communication terminal 300 requests, to the wireless base station 100, moving information of vehicles, which are receiving radio waves, other than the vehicle 200 camped on. In the example illustrated in FIG. 3, the wireless communication terminal 300 requests, to the wireless base station 100, the moving information of the vehicle 260 and the vehicle 270, because the wireless communication terminal 300 is receiving radio wave from the vehicle 260 and the vehicle 270.

At S214, in response to the request received at S212, the wireless base station 100 transmits the moving information of the vehicle 260 received at S204 and the moving information of the vehicle 270 received at S208 to the wireless communication terminal 300.

At S216, the wireless communication terminal 300 includes the moving information of the vehicle 260 and the moving information of the vehicle 270 into a measurement report of the received-radio-wave intensity measured at S210, to transmit the measurement report to the vehicle 200. At S218, the vehicle 200 determines an HO destination or a CA destination for the wireless communication terminal 300, based on the received-radio-wave intensity and the moving information of the vehicle 260 and the vehicle 270 included in the measurement report received at S216 and the moving information of the own-vehicle.

Figure 4:
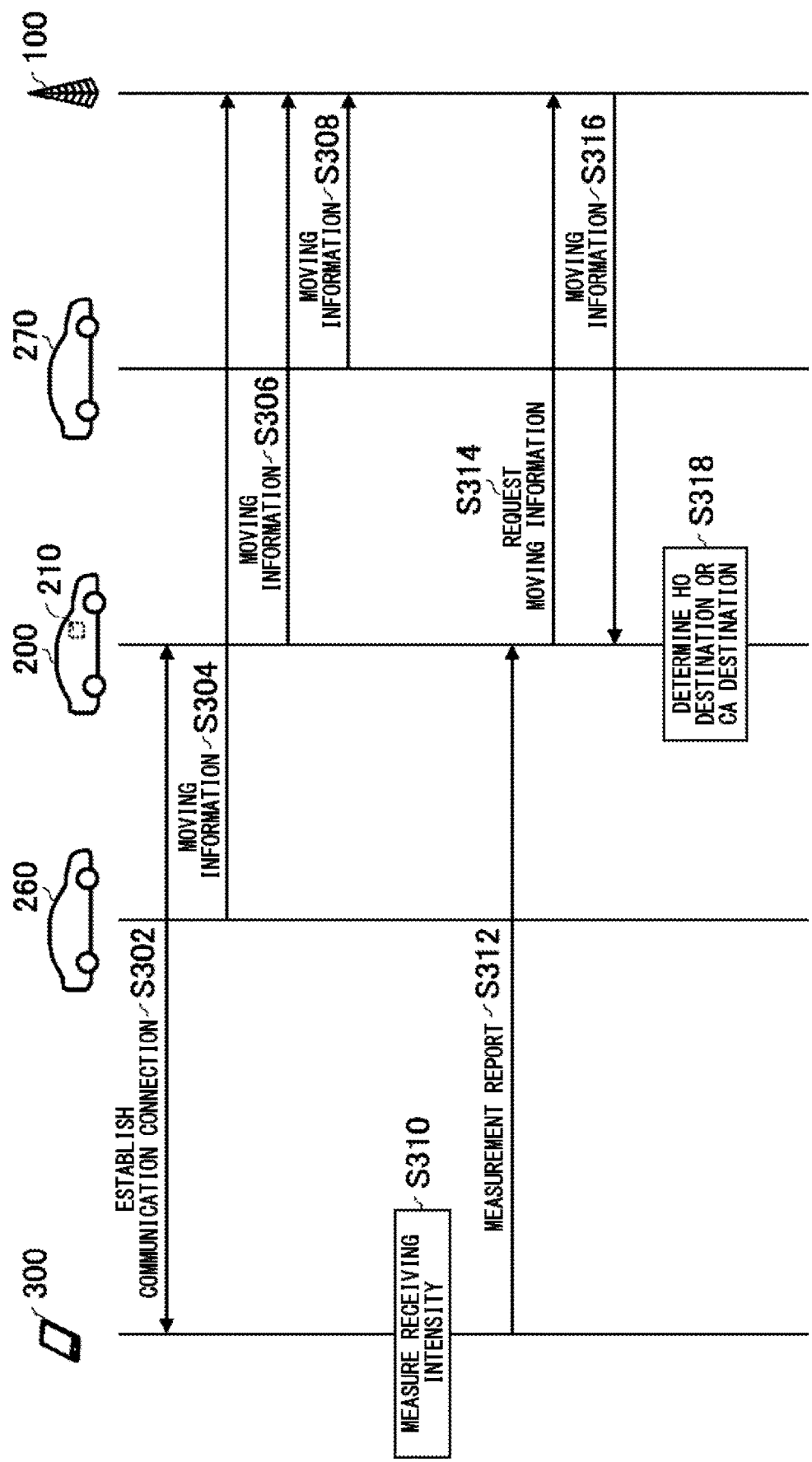
FIG. 4 schematically illustrates an example of a flow of processes performed by the communication system 10.

FIG. 4 schematically illustrates an example of a flow of processes performed by the communication system 10. Herein, different points from FIG. 2 are mainly described. In the example illustrated in FIG. 4, a vehicle 200, a vehicle 260, and a vehicle 270 camped on the wireless base station 100 intermittently transmit moving information to the wireless base station 100.

At S302, the wireless communication terminal 300 and the wireless base station 100 establish a communication connection. At S304, the vehicle 260 transmits moving information of the vehicle 260 to the wireless base station 100. At S306, the vehicle 200 transmits moving information of the vehicle 200 to the wireless base station 100. At S308, the vehicle 270 transmits moving information of the vehicle 270 to the wireless base station 100.

At S310, the wireless communication terminal 300 performs a measurement of a received-radio-wave intensity. At S312, the wireless communication terminal 300 transmits a measurement report of the received-radio-wave intensity measured at S310 to the vehicle 200.

At S314, the vehicle 200 requests, to the wireless base station 100, moving information of other vehicles in which the measurement report is included in the measurement result received at S312. In the example illustrated in FIG. 4, the vehicle 200 requests, to the wireless base station 100, the moving information of the vehicle 260 and the vehicle 270, because the measurement report includes the measurement results of the vehicle 260 and the vehicle 270.

At S316, in response to the request received at S314, the wireless base station 100 transmits the moving information of the vehicle 260 received at S304 and the moving information of the vehicle 270 received at S308 to the vehicle 200. At S318, the vehicle 200 determines an HO destination or a CA destination for the wireless communication terminal 300, based on the received-radio-wave intensity included in the measurement report received at S316 as well as the moving information of the vehicle 260 and vehicle 270 and the moving information of the own-vehicle.

In FIG. 2 to FIG. 4, the determination of an HO destination or a CA destination of the vehicle 200 has been described, exemplifying a case that the in-vehicle device 210 that is an example of a control device mounted in the vehicle 200 performs the determination, but not limited thereto. The wireless base station 100 may perform the determination of an HO destination or a CA destination of the vehicle 200. In this case, the wireless base station 100 may be an example of the control device.

Figure 5:
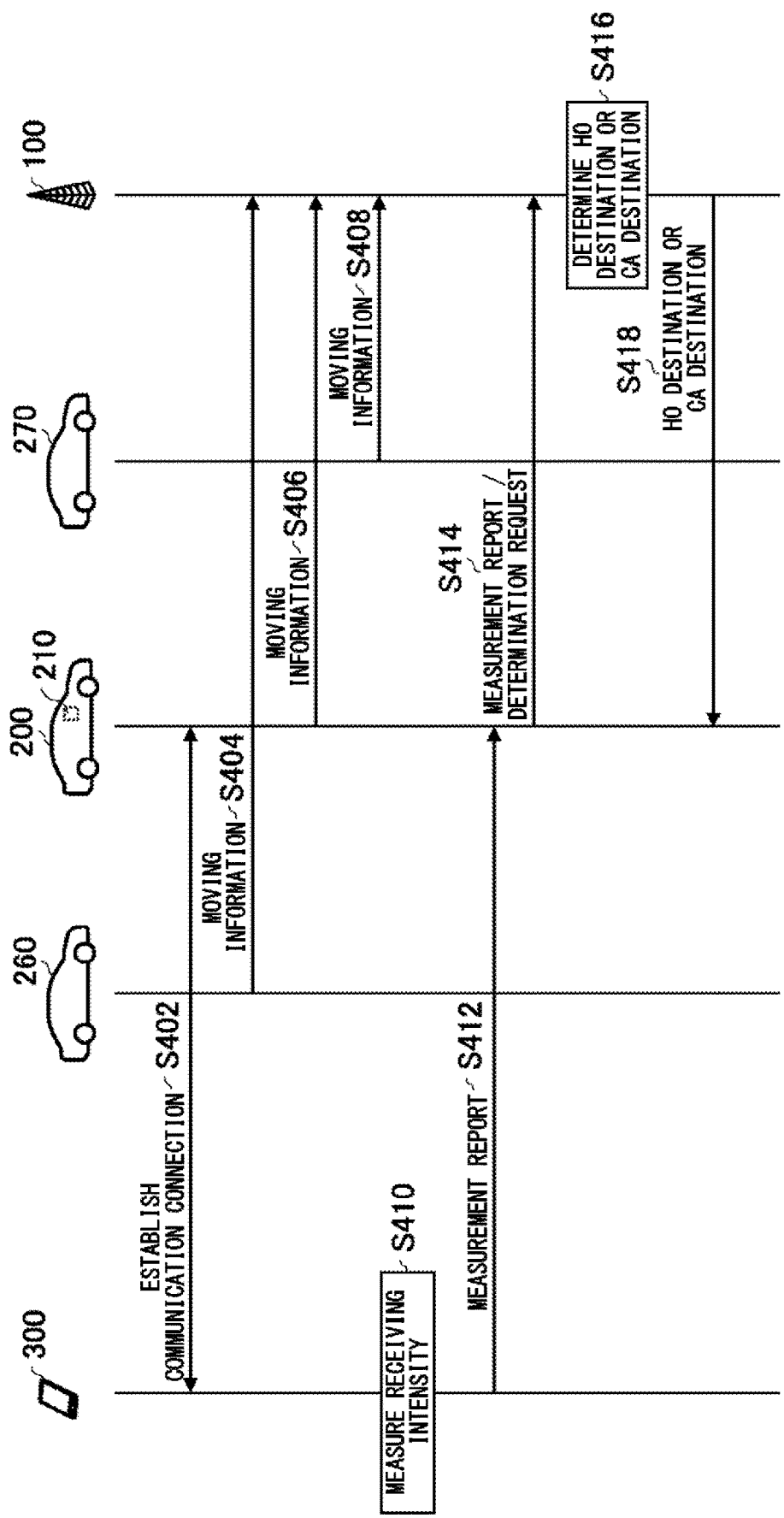
FIG. 5 schematically illustrates an example of a flow of processes performed by the communication system 10.

FIG. 5 schematically illustrates an example of a flow of processes performed by the communication system 10. Herein, different points from FIG. 2 are mainly described. In the example illustrated in FIG. 5, a vehicle 200, a vehicle 260, and a vehicle 270 camped on the wireless base station 100 intermittently transmit moving information to the wireless base station 100.

At S402, the wireless communication terminal 300 and the wireless base station 100 establish a communication connection. At S404, the vehicle 260 transmits moving information of the vehicle 260 to the wireless base station 100. At S406, the vehicle 200 transmits moving information of the vehicle 200 to the wireless base station 100. At S408, the vehicle 270 transmits moving information of the vehicle 270 to the wireless base station 100.

At S410, the wireless communication terminal 300 performs a measurement of a received-radio-wave intensity. At S412, the wireless communication terminal 300 transmits a measurement report of the received-radio-wave intensity measured at S410 to the vehicle 200.

At S414, the vehicle 200 transmits a measurement report received at S412 and a determination request of an HO destination or a CA destination of the wireless communication terminal 300 camped on the vehicle 200 to the wireless base station 100. At S416, in response to the determination request received at S414, the wireless base station 100 determines the HO destination or the CA destination of the wireless communication terminal 300. The wireless base station 100 may determine the HO destination or the CA destination of the wireless communication terminal 300, based on the received-radio-wave intensity from the vehicle 260 and the vehicle 270 included in the measurement report receive at S414, and the moving information of the vehicle 260, the vehicle 200, and the vehicle 270 received at S404, S406, and S408. At S418, the wireless base station 100 transmits the HO destination or the CA destination determined at S416 to the vehicle 200.

Figure 6:
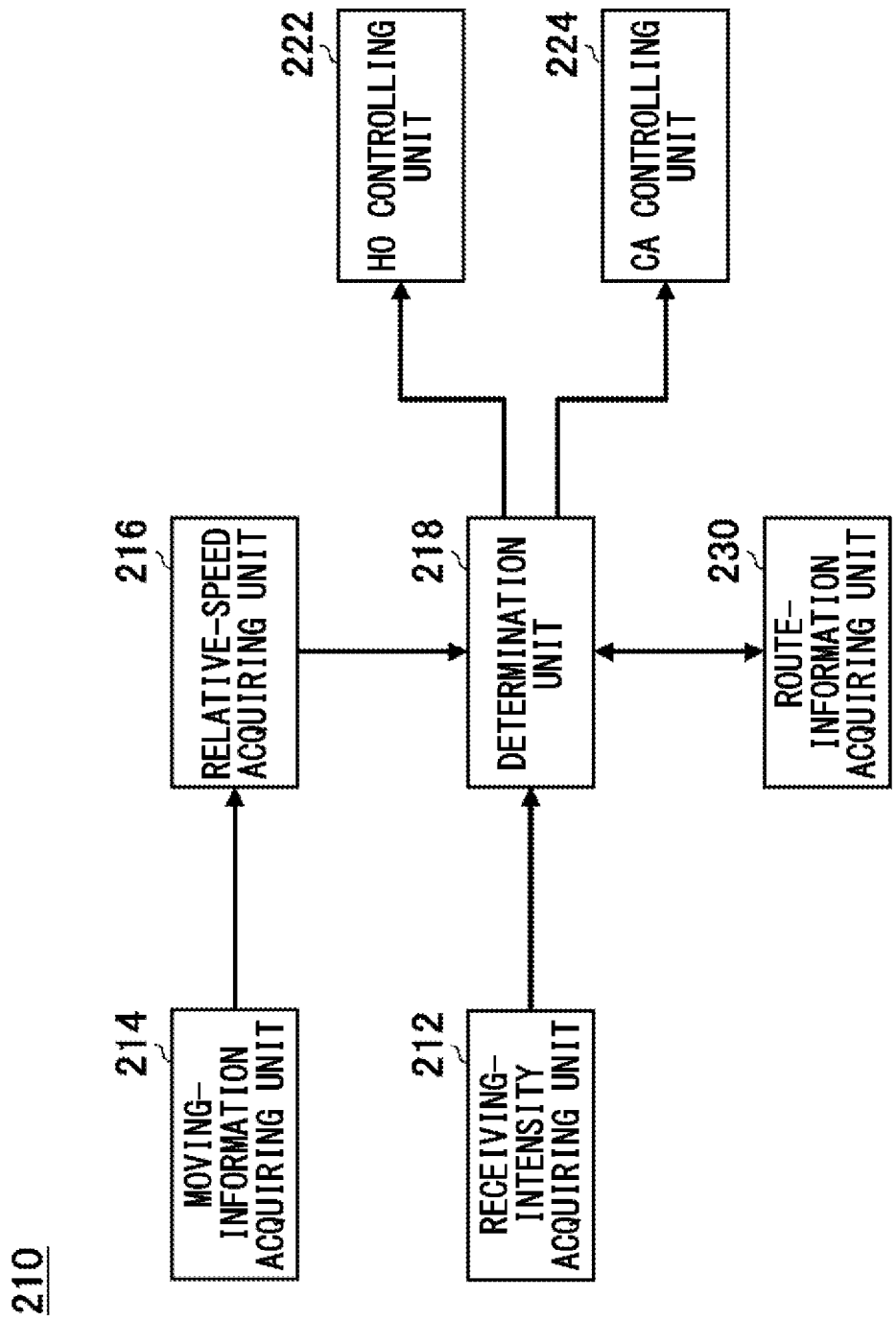
FIG. 6 schematically illustrates an example of a functional configuration of an in-vehicle device 210 functioning as a control device.

FIG. 6 schematically illustrates an example of a functional configuration of an in-vehicle device 210 functioning as a control device. The in-vehicle device 210 includes a receiving-intensity acquiring unit 212, a moving-information acquiring unit 214, a relative-speed acquiring unit 216, a determination unit 218, an HO controlling unit 222, a CA controlling unit 224, and a route-information acquiring unit 230. The in-vehicle device 210 is not necessarily required to include all these components.

The receiving-intensity acquiring unit 212 acquires a receiving-intensity of a radio wave received by the wireless communication terminal 300 camped on the vehicle 200 (which may be described as the own-vehicle) in which the in-vehicle device 210 is mounted. The receiving-intensity acquiring unit 212 may acquire, from the measurement report transmitted by the wireless communication terminal 300, the receiving-intensity of the radio wave received from other vehicles 200 by the wireless communication terminal 300.

The moving-information acquiring unit 214 acquires moving information of the own-vehicle and moving information of other vehicles 200. The moving-information acquiring unit 214 may acquire the moving information, which is managed by the in-vehicle device 210, of the own-vehicle. The moving-information acquiring unit 214 may acquire the moving information, of which the wireless communication terminal 300 is receiving radio waves, of other vehicles 200. When the moving information, of which the wireless communication terminal 300 is receiving the radio waves, of other vehicles 200 is included in the measurement report transmitted by the wireless communication terminal 300, the moving-information acquiring unit 214 may acquire the moving information.

In addition, the moving-information acquiring unit 214 may receive, from the wireless base station 100, the moving information, of which the wireless communication terminal 300 is receiving radio waves, of other vehicles 200. For example, the moving-information acquiring unit 214 requests, to the wireless base station 100, the moving information, of which the measurement results are included in the measurement report transmitted by the wireless communication terminal 300, of other vehicles 200, and acquire the moving information transmitted by the wireless base station 100 in response to the request.

The moving-information acquiring unit 214 may acquire the moving information of the wireless communication terminal 300. The moving-information acquiring unit 214 may receive the moving information of the wireless communication terminal 300 from the wireless communication terminal 300. For example, the wireless communication terminal 300 can include the moving information of the wireless communication terminal 300 into the measurement report of the receiving-intensity to transmit the measurement report to the vehicle 200. In addition, the wireless communication terminal 300 can transmit the moving information of the wireless communication terminal 300 to the vehicle 200, in response to a request from the vehicle 200.

The relative-speed acquiring unit 216 acquires relative speeds between the own-vehicle and other vehicles 200. The relative-speed acquiring unit 216 derives relative speeds between the own-vehicle and other vehicles 200, for example, from the moving information of the own-vehicle acquired by the moving-information acquiring unit 214 and the moving information of other vehicles 200. The relative-speed acquiring unit 216 may calculate relative speeds between the own-vehicle and other vehicles 200 from a moving speed and a moving direction of the own-vehicle and moving speeds and moving directions of other vehicles 200.

The relative-speed acquiring unit 216 may acquire relative speeds between the own-vehicle and other vehicles 200 from the wireless communication terminal 300. For example, the wireless communication terminal 300 receives the moving information from the vehicle 200 camped on, while acquires the moving information included in the broadcasting information of other vehicles 200. Then, the wireless communication terminal 300 derives relative speeds between the own-vehicle and other vehicles 200 from the moving information of a vehicle 200 camped on and the moving information of other vehicles 200, and transmits the relative speed to the vehicle 200.

The relative-speed acquiring unit 216 may acquire relative speeds between the own-vehicle and other vehicles 200 from the wireless base station 100. For example, the wireless base station 100 stores the moving information intermittently transmitted from each of a plurality of vehicles 200 camped on the wireless base station 100, derives, from the stored multiple pieces of moving information, each relative speed of the plurality of vehicles 200, and transmits a target relative speed to the vehicle 200 in response to a request from the vehicle 200.

The relative-speed acquiring unit 216 may acquire relative speeds between other vehicles 200 and the wireless communication terminal 300. For example, the relative-speed acquiring unit 216 derives relative speeds between other vehicles 200 and the wireless communication terminal 300 from the moving information of other vehicles 200 and the moving information of the wireless communication terminal 300. The relative-speed acquiring unit 216 calculates relative speeds between other vehicles 200 and the wireless communication terminal 300 from the moving speeds and moving directions of other vehicles 200 and the moving speed and the moving direction of the wireless communication terminal 300.

The determination unit 218 may determine an HO destination of the wireless communication terminal 300 camped on the own-vehicle. The determination unit 218 can determine the HO destination of the wireless communication terminal 300 camped on the own-vehicle, based on the relative speed acquired by the relative-speed acquiring unit 216.

When the relative speed between the own-vehicle and another vehicle 200 are slower than the predetermined speed, the determination unit 218 can determine the another vehicle 200 as the HO destination of the wireless communication terminal 300. In addition, when the relative speed between the own-vehicle and another vehicle 200 is slower than a predetermined first speed and when the relative speed between the another vehicle 200 and the wireless communication terminal 300 is slower than a predetermined second speed, the determination unit 218 can determine the another vehicle 200 as the HO destination of the wireless communication terminal 300.

The determination unit 218 can determine the HO destination of the wireless communication terminal 300, based on the receiving-intensity of the radio wave received by the wireless communication terminal 300 and acquired by the receiving-intensity acquiring unit 212 and the relative speed acquired by the relative-speed acquiring unit 216.

The determination unit 218 can determine, as the HO destination of the wireless communication terminal 300, another vehicle 200 in which the radio wave reception intensity by the wireless communication terminal 300 is stronger than the predetermined intensity and whose relative speed to the own-vehicle is slower than the predetermined speed. The determination unit 218 can determine, as the HO destination of the wireless communication terminal 300, another vehicle 200 in which the radio wave reception intensity by the wireless communication terminal 300 is stronger than the predetermined intensity and whose relative speed to the own-vehicle is slower than a predetermined first speed and whose relative speed to the wireless communication terminal 300 is slower than a predetermined second speed.

The determination unit 218 may determine, as the HO destination of the wireless communication terminal 300, another vehicle 200 whose relative speed to the own-vehicle is slower among other vehicles 200 in which the radio wave reception intensity by the wireless communication terminal 300 is stronger than the predetermined intensity. For example, the determination unit 218 determines, as the HO destination of the wireless communication terminal 300, another vehicle 200 whose relative speed to the own-vehicle is the slowest among other vehicles 200 in which the radio wave reception intensity by the wireless communication terminal 300 is stronger than the predetermined intensity.

The determination unit 218 may determine, as the HO destination of the wireless communication terminal 300, another vehicle 200 whose relative speed to the wireless communication terminal 300 is slower among other vehicles 200 in which the radio wave reception intensity by the wireless communication terminal 300 is stronger than the predetermined intensity and whose relative speed to the own-vehicle is slower than the predetermined speed. For example, the determination unit 218 determines, as the HO destination of the wireless communication terminal 300, another vehicle 200 whose relative speed to the wireless communication terminal 300 is the slowest among other vehicles 200 in which the radio wave reception intensity by the wireless communication terminal 300 is stronger than the predetermined intensity and whose relative speed to the own-vehicle is slower than the predetermined speed.

The determination unit 218 may determine, as the HO destination of the wireless communication terminal 300, another vehicle 200 whose relative speed to the own-vehicle is slower among other vehicles 200 in which the radio wave reception intensity by the wireless communication terminal 300 is stronger than the predetermined intensity and whose moving speed is slower than the own-vehicle. For example, the determination unit 218 determines, as the HO destination of the wireless communication terminal 300, another vehicle 200 whose relative speed to the own-vehicle is the slowest among other vehicles 200 in which the radio wave reception intensity by the wireless communication terminal 300 is stronger than the predetermined intensity and whose moving speed is slower than the own-vehicle.

The determination unit 218 may determine a CA destination for the wireless communication terminal 300 camped on the own-vehicle. The determination unit 218 can determine the CA destination for the wireless communication terminal 300 camped on the own-vehicle, based on the relative speed acquired by the relative-speed acquiring unit 216.

When the relative speed between the own-vehicle and another vehicle 200 are slower than the predetermined speed, the determination unit 218 can determine the another vehicle 200 as the CA destination of the wireless communication terminal 300. In addition, when the relative speed between the own-vehicle and another vehicle 200 is slower than a predetermined first speed and when the relative speed between the another vehicle 200 and the wireless communication terminal 300 is slower than a predetermined second speed, the determination unit 218 can determine the another vehicle 200 as the CA destination of the wireless communication terminal 300.

The determination unit 218 can determine the CA destination of the wireless communication terminal 300, based on the receiving-intensity of the radio wave received by the wireless communication terminal 300 and acquired by the receiving-intensity acquiring unit 212 and the relative speed acquired by the relative-speed acquiring unit 216.

The determination unit 218 can determine, as the CA destination for the wireless communication terminal 300, another vehicle 200 in which the radio wave reception intensity by the wireless communication terminal 300 is stronger than the predetermined intensity and whose relative speed to the own-vehicle is slower than the predetermined speed. The determination unit 218 can determine, as the CA destination for the wireless communication terminal 300, another vehicle 200 in which the radio wave reception intensity by the wireless communication terminal 300 is stronger than the predetermined intensity and whose relative speed to the own-vehicle is slower than a predetermined first speed and whose relative speed to the wireless communication terminal 300 is slower than a predetermined second speed.

The determination unit 218 may determine, as the CA destination for the wireless communication terminal 300, another vehicle 200 whose relative speed to the own-vehicle is slower among other vehicles 200 in which the radio wave reception intensity by the wireless communication terminal 300 is stronger than the predetermined intensity. For example, the determination unit 218 determines, as the CA destination for the wireless communication terminal 300, another vehicle 200 whose relative speed to the own-vehicle is the slowest among other vehicles 200 in which the radio wave reception intensity by the wireless communication terminal 300 is stronger than the predetermined intensity.

The determination unit 218 may determine, as the CA destination for the wireless communication terminal 300, another vehicle 200 whose relative speed to the wireless communication terminal 300 is slower among other vehicles 200 in which the radio wave reception intensity by the wireless communication terminal 300 is stronger than the predetermined intensity and whose relative speed to the own-vehicle is slower than the predetermined speed. For example, the determination unit 218 determines, as the CA destination for the wireless communication terminal 300, another vehicle 200 whose relative speed to the wireless communication terminal 300 is the slowest among other vehicles 200 in which the radio wave reception intensity by the wireless communication terminal 300 is stronger than the predetermined intensity and whose relative speed to the own-vehicle is slower than the predetermined speed.

The HO controlling unit 222 controls such that the HO destination of the wireless communication terminal 300 becomes another vehicle 200 determined as the HO destination of the wireless communication terminal 300 by the determination unit 218. The HO controlling unit 222 controls such that the HO destination of the wireless communication terminal 300 becomes another vehicle 200 determined as the HO destination by the determination unit 218, for example, by including another vehicle 200 determined as the HO destination by the determination unit 218 into a neighboring-cell list transmitted to the wireless communication terminal 300.

The CA controlling unit 224 controls such that the in-vehicle device 210 registers, as the CA destination for the wireless communication terminal 300, another vehicle 200 determined as the CA destination by the determination unit 218. The CA controlling unit 224 causes the in-vehicle device 210 to register, as the CA destination for the wireless communication terminal 300, another vehicle 200 determined as the CA destination by the determination unit 218. In addition, the CA controlling unit 224 informs the wireless communication terminal 300 of another vehicle 200 determined as the CA destination by the determination unit 218, as the CA destination.

The route-information acquiring unit 230 acquires route information indicating a planned moving route of the own-vehicle and route information indicating planned moving route s of other vehicles 200. The route-information acquiring unit 230 may acquire, as the route information of the own-vehicle, route information managed by the in-vehicle device 210.

The route-information acquiring unit 230 receives the route information of other vehicles 200 from, for example, the wireless base station 100. For example, the wireless base station 100 can intermittently receive route information from each of a plurality of vehicles 200 and stores the information, then, in response to requests from the vehicles 200, transmit the route information to the vehicles 200. For example, the route-information acquiring unit 230 requests, to the wireless base station 100, the route information of other vehicles 200 of which the measurement results are included in the measurement report transmitted by the wireless communication terminal 300, then acquires the route information transmitted from the wireless base station 100 in response to requests. The determination unit 218 may determine the HO destination of the wireless communication terminal 300 or the CA destination for the wireless communication terminal 300, further based on the route information acquired by the route-information acquiring unit 230.

For example, the determination unit 218 determines, as the HO destination of the wireless communication terminal 300 or the CA destination for the wireless communication terminal 300, another vehicle 200 whose planned moving route is in a higher degree of coincidence with the planned moving route of the own-vehicle among other vehicles 200 in which the radio wave reception intensity by the wireless communication terminal 300 is stronger than the predetermined intensity and whose relative speed to the own-vehicle is slower than the predetermined speed.

The predetermined intensity described above may be arbitrarily configurable or may be changeable. The predetermined speed described above may be arbitrarily configurable or may be changeable. The predetermined first speed described above may be arbitrarily configurable or may be changeable. The predetermined second speed described above may be arbitrarily configurable or may be changeable.

Figure 7:
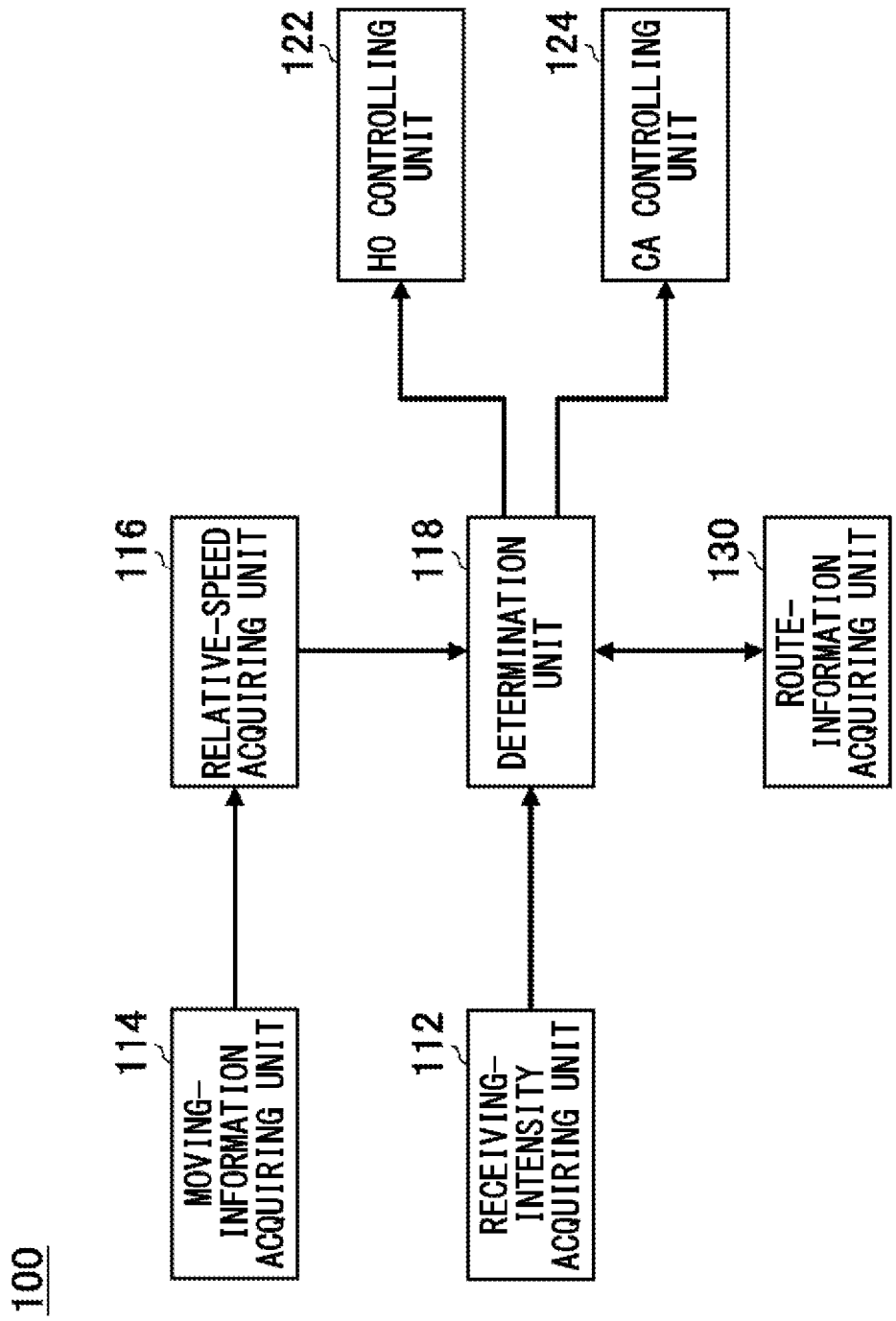
FIG. 7 schematically illustrates an example of a functional configuration of a wireless base station 100 functioning as a control device.

FIG. 7 schematically illustrates an example of a functional configuration of the wireless base station 100 functioning as a control device. The wireless base station 100 includes a receiving-intensity acquiring unit 112, a moving-information acquiring unit 114, a relative-speed acquiring unit 116, a determination unit 118, an HO controlling unit 122, a CA controlling unit 124, and a route-information acquiring unit 130. The wireless base station 100 is not necessarily required to include all these components. Herein, mainly described are different points from the receiving-intensity acquiring unit 212, the moving-information acquiring unit 214, the relative-speed acquiring unit 216, the determination unit 218, the HO controlling unit 222, the CA controlling unit 224, and the route-information acquiring unit 230.

The receiving-intensity acquiring unit 112 acquires a receiving-intensity of a radio wave received by the wireless communication terminal 300 camped on the vehicle 200 camped on the wireless base station 100. The receiving-intensity acquiring unit 112 may receive, from the vehicle 200, a measurement report transmitted to the vehicle 200 by the wireless communication terminal 300, and acquire, from the measurement report, the receiving-intensity of the radio wave received by the wireless communication terminal 300.

The moving-information acquiring unit 114 acquires moving information of a plurality of vehicles 200 camped on the wireless base station 100. The moving-information acquiring unit 114 may acquire moving information intermittently transmitted from each of the plurality of vehicles 200.

The relative-speed acquiring unit 116 acquires each relative speed of the plurality of vehicles 200 camped on the wireless base station 100. The relative-speed acquiring unit 116 may derive each relative speed of the plurality of vehicles 200 from respective moving information, acquired by the moving-information acquiring unit 114, of the plurality of vehicles 200. For example, the relative-speed acquiring unit 116 calculates each relative speed of the plurality of vehicles 200 from each moving speed and moving direction of the plurality of vehicles 200.

The determination unit 118 determines an HO destination of the wireless communication terminal 300 camped on the vehicle 200 camped on the wireless base station 100. The determination unit 118 can determine the HO destination of the wireless communication terminal 300, based on the relative speed acquired by the relative-speed acquiring unit 116.

The determination unit 118 can determine a second vehicle 200 as the HO destination of the wireless communication terminal 300 camped on a first vehicle 200, when the relative speed between the first vehicle 200 and the second vehicle 200 is slower than the predetermined speed. In addition, the determination unit 118 can determine the second vehicle 200 as the HO destination of the wireless communication terminal 300 camped on a first wireless base station 100, when the relative speed between the first wireless base station 100 and the second vehicle 200 is slower than the predetermined first speed, and when the relative speed between the second vehicle 200 and the wireless communication terminal 300 is slower than the predetermined second speed.

The determination unit 118 can determine the HO destination of the wireless communication terminal 300, based on the receiving-intensity, acquired by the receiving-intensity acquiring unit 112, of the radio wave receive by the wireless communication terminal 300 camped on the first vehicle 200 and the relative speed acquired by the relative-speed acquiring unit 216.

The determination unit 118 can determine, as the HO destination of the wireless communication terminal 300, the second vehicle 200 in which the radio wave reception intensity by the wireless communication terminal 300 is stronger than the predetermined intensity and whose relative speed to the first vehicle 200 is slower than the predetermined speed. The determination unit 118 can determine, as the HO destination of the wireless communication terminal 300, the second vehicle 200 in which the radio wave reception intensity by the wireless communication terminal 300 is stronger than the predetermined intensity and whose relative speed to the first vehicle 200 is slower than the predetermined first speed and whose relative speed to the wireless communication terminal 300 is slower than the predetermined second speed.

The determination unit 118 may determine, as the HO destination of the wireless communication terminal 300, the vehicle 200 whose relative speed to the first vehicle 200 is slower among the plurality of vehicles 200 in which the radio wave reception intensity by the wireless communication terminal 300 camped on the first vehicle 200 is stronger than the predetermined intensity. For example, the determination unit 118 determines, as the HO destination of the wireless communication terminal 300, another vehicle 200 whose relative speed to the first vehicle 200 is the slowest among the plurality of vehicles 200 in which the radio wave reception intensity by the wireless communication terminal 300 camped on the first vehicle 200 is stronger than the predetermined intensity.

The determination unit 118 may determine, as the HO destination of the wireless communication terminal 300, the vehicle 200 whose relative speed to the wireless communication terminal 300 is slower, among the plurality of vehicles 200 in which the radio wave reception intensity by the wireless communication terminal 300 camped on the first vehicle 200 is stronger than the predetermined intensity and whose relative speed to the first vehicle 200 is slower than the predetermined speed. For example, the determination unit 118 determines, as the HO destination of the wireless communication terminal 300, the vehicle 200 whose relative speed to the wireless communication terminal 300 is the slowest, among the plurality of vehicles 200 in which the radio wave reception intensity by the wireless communication terminal 300 camped on the first vehicle 200 is stronger than the predetermined intensity and whose relative speed to the first vehicle 200 is slower than the predetermined speed.

The determination unit 118 may determine, as the HO destination of the wireless communication terminal 300, the vehicle 200 whose relative speed to the first vehicle 200 is slower, among the plurality of the vehicles 200 in which the radio wave reception intensity by the wireless communication terminal 300 camped on the first vehicle 200 is stronger than the predetermined intensity and whose moving speed is slower than the first vehicle 200. For example, the determination unit 118 determines, as the HO destination of the wireless communication terminal 300, the vehicle 200 whose relative speed to the first vehicle 200 is the slowest, among the vehicles 200 in which the radio wave reception intensity by the wireless communication terminal 300 camped on the first vehicle 200 is stronger than the predetermined intensity and whose moving speed is slower than the first vehicle 200.

The determination unit 118 determines a CA destination of the first vehicle 200 for the wireless communication terminal 300 camped on the first vehicle 200 camped on the wireless base station 100. The determination unit 118 can determines the CA destination of the first vehicle 200 for the wireless communication terminal 300 camped on the first vehicle 200, based on the relative speed acquired by the relative-speed acquiring unit 216.

The determination unit 118 can determine the second vehicle 200 as the CA destination of the first vehicle 200 for the wireless communication terminal 300, when the relative speed between the first vehicle 200 and the second vehicle 200 is slower than the predetermined speed. In addition, the determination unit 118 can determine the second vehicle 200 as the CA destination of the first vehicle 200 for the wireless communication terminal 300, when the relative speed between the first vehicle 200 and the second vehicle 200 is slower than the predetermined first speed and when the relative speed between the second vehicle 200 and the wireless communication terminal 300 is slower than the predetermined second speed.

The determination unit 118 can determine the CA destination of the first vehicle 200 for the wireless communication terminal 300, based on the receiving-intensity of the radio wave received by the wireless communication terminal 300 and acquired by the receiving-intensity acquiring unit 112 and the relative speed acquired by the relative-speed acquiring unit 116.

The determination unit 118 can determine, as the CA destination of the first vehicle 200 for the wireless communication terminal 300, the vehicle 200 in which the radio wave reception intensity by the wireless communication terminal 300 camped on the first vehicle 200 is stronger than the predetermined intensity and whose relative speed to the first vehicle 200 is slower than the predetermined speed. The determination unit 118 can determine, as the CA destination of the first vehicle 200 for the wireless communication terminal 300, the vehicle 200 in which the radio wave reception intensity by the wireless communication terminal 300 is stronger than the predetermined intensity and whose relative speed to the first vehicle 200 is slower than the predetermined first speed and whose relative speed to the wireless communication terminal 300 is slower than the predetermined second speed.

The determination unit 118 may determine, as the CA destination of the first vehicle 200 for the wireless communication terminal 300, the vehicle 200 whose relative speed to the first vehicle 200 is slower, among the vehicles 200 in which the radio wave reception intensity by the wireless communication terminal 300 camped on the first vehicle 200 is stronger than the predetermined intensity. For example, the determination unit 118 determines, as the CA destination of the first vehicle 200 for the wireless communication terminal 300, the vehicle 200 whose relative speed to the first vehicle 200 is the slowest, among the vehicles 200 in which the radio wave reception intensity by the wireless communication terminal 300 camped on the first vehicle 200 is stronger than the predetermined intensity.

The determination unit 118 may determine, as the CA destination of the first vehicle 200 for the wireless communication terminal 300, the vehicle 200 whose relative speed to the wireless communication terminal 300 is slower, among the vehicles 200 in which the radio wave reception intensity by the wireless communication terminal 300 camped on the first vehicle 200 is stronger than the predetermined intensity and whose relative speed to the first vehicle 200 is slower than the predetermined speed. For example, the determination unit 118 determines, as the CA destination of the first vehicle 200 for the wireless communication terminal 300, the vehicle 200 whose relative speed to the wireless communication terminal 300 is the slowest, among the vehicles 200 in which the radio wave reception intensity by the wireless communication terminal 300 camped on the first vehicle 200 is stronger than the predetermined intensity and whose relative speed to the first vehicle 200 is slower than the predetermined speed.

The HO controlling unit 122 controls such that the HO destination of the wireless communication terminal 300 camped on the first vehicle 200 becomes the vehicle 200 determined as the HO destination of the wireless communication terminal 300 by the determination unit 118. The HO controlling unit 122 controls such that the HO destination of the wireless communication terminal 300 becomes another vehicle 200 determined as the HO destination by the determination unit 118, for example, by including another vehicle 200 determined as the HO destination by the determination unit 118 into a neighboring-cell list transmitted to the wireless communication terminal 300 by the first vehicle 200.

The CA controlling unit 124 controls such that the first vehicle 200 registers, as the CA destination for the wireless communication terminal 300, a vehicle 200 determined as the CA destination of the first vehicle 200 by the determination unit 118. The CA controlling unit 124 causes the first vehicle 200 to register, as the CA destination for the wireless communication terminal 300, the vehicle 200 determined as the CA destination by the determination unit 118. In addition, the CA controlling unit 124 informs the wireless communication terminal 300 of another vehicle 200 determined as the CA destination by the determination unit 118, as the CA destination.

The route-information acquiring unit 130 acquires route information indicating respective planned moving route of a plurality of vehicles 200 camped on the wireless base station 100. The route-information acquiring unit 230 may intermittently receive route information from each of the plurality of vehicles 200. The determination unit 118 may determine the HO destination of the wireless communication terminal 300 or the CA destination for the wireless communication terminal 300, further based on the route information acquired by the route-information acquiring unit 130.

For example, the determination unit 118 determines, as the HO destination of the wireless communication terminal 300 or the CA destination of the first vehicle 200 for the wireless communication terminal 300, a vehicle 200 whose planned moving route is in a higher degree of coincidence with the planned moving route of the first vehicle 200, among the vehicles 200 in which the radio wave reception intensity by the wireless communication terminal 300 camped on the first vehicle 200 is stronger than the predetermined intensity and whose relative speed to the first vehicle 200 is slower than the predetermined speed.

Figure 8:
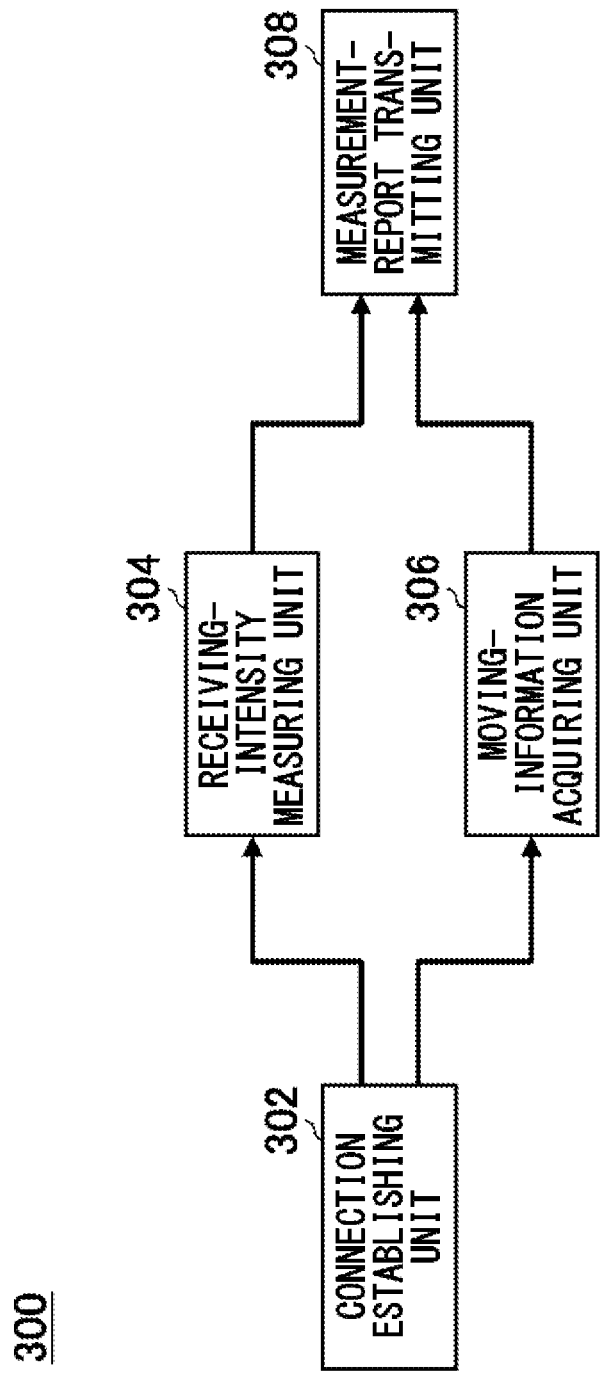
FIG. 8 schematically illustrates an example of a functional configuration of a wireless communication terminal 300.

FIG. 8 schematically illustrates an example of a functional configuration of the wireless communication terminal 300. The wireless communication terminal 300 includes a connection establishing unit 302, a receiving-intensity measuring unit 304, a moving-information acquiring unit 306, and a measurement-report transmitting unit 308.

The connection establishing unit 302 establishes a wireless communication connection with the vehicle 200. The receiving-intensity measuring unit 304 measures a receiving-intensity of a radio wave received by the wireless communication terminal 300. For example, the receiving-intensity measuring unit 304 associates a receiving-intensity of broadcasting information transmitted by the vehicle 200 with information identifying the vehicle 200 included in the broadcasting information, to store the information.

The moving-information acquiring unit 306 acquires moving information of the vehicle 200. The moving-information acquiring unit 306 may acquire the moving information, when the moving information of the vehicle 200 is included in the broadcasting information transmitted by the vehicle 200. The moving-information acquiring unit 306 may request, to the wireless base station 100, the moving information of a source of a radio wave of which the receiving-intensity measuring unit 304 has measured the receiving-intensity, and acquire the moving information transmitted in response to the request by the wireless base station 100.

The measurement-report transmitting unit 308 transmits a measurement report of the radio wave that the wireless communication terminal 300 is receiving to the wireless base station 100. The measurement-report transmitting unit 308 may transmit the measurement report including the receiving-intensity measured by the receiving-intensity measuring unit 304 to the wireless base station 100. The measurement-report transmitting unit 308 may include the moving information into the measurement report and transmit the measurement report to the wireless base station 100, when the moving information is acquired by the moving-information acquiring unit 306.

Figure 9:
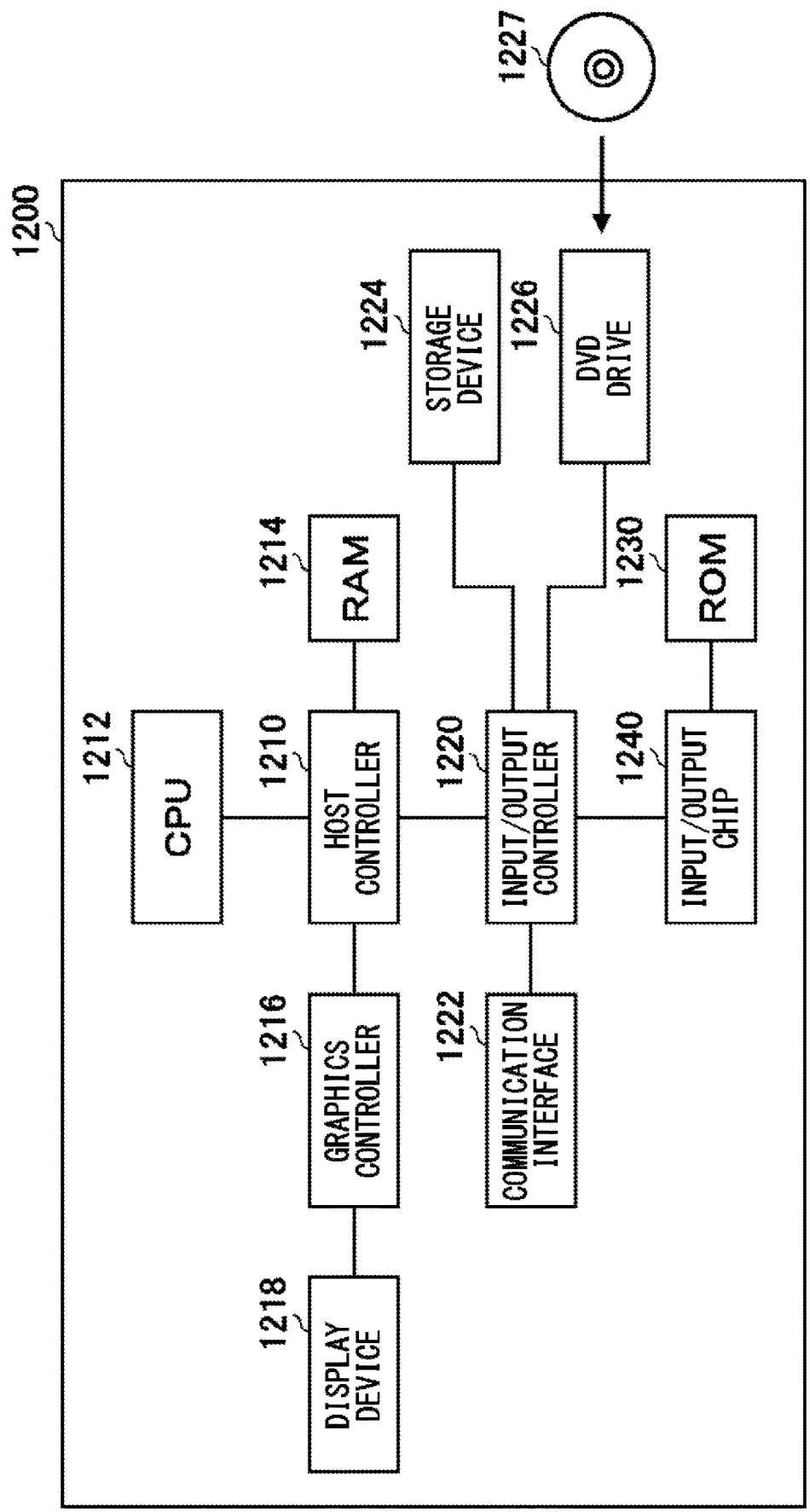
FIG. 9 schematically illustrates an example of a hardware configuration of a computer 1200 functioning as an in-vehicle device 210 or the wireless base station 100.

FIG. 9 schematically illustrates an example of a hardware configuration of a computer 1200 functioning as the in-vehicle device 210 or the wireless base station 100. A program installed in the computer 1200 can cause the computer 1200 to function as one or more "units" of an apparatus according to the above embodiments, or can cause the computer 1200 to perform operations associated with the apparatus according to the above embodiments or perform the one or more "units", and/or can cause the computer 1200 to perform processes according to the above embodiments or steps of the processes. Such a program may be executed by a CPU 1212, in order to cause the computer 1200 to perform specific operations associated with some or all of blocks of flow charts and block diagrams set forth herein.

The computer 1200 according to this embodiment includes the CPU 1212, a RAM 1214, and a graphics controller 1216, which are interconnected by a host controller 1210. The computer 1200 also includes a communication interface 1222, a storage device 1224, a DVD drive 1226, and an input/output unit such as an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 may also include a ROM 1230 and a legacy input/output unit such as a touch panel, which are connected to the input/output controller 1220 via the input/output chip 1240.

The CPU 1212 operates according to programs stored in the ROM 1230 and the RAM 1214, thereby controlling each unit. The graphics controller 1216 acquires image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 within the computer 1200. The DVD drive 1226 reads the programs or the data from the DVD-ROM 1227 or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

A program is provided by a computer-readable storage medium such as the DVD-ROM 1227 or the IC card. The program is read from the computer-readable storage medium, installed onto the storage device 1224, RAM 1214, or ROM 1230, which are also examples of the computer-readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the use of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive 1226 (DVD-ROM 1227), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replacement of information, etc., as described throughout this disclosure and specified by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is specified, from among the plurality of entries, and read the attribute value of the second attribute stored in the entry, thereby acquiring the attribute value of the second attribute associated with the first attribute satisfying the predetermined condition.

The above-explained program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flow charts and block diagrams in the above embodiments may represent steps of processes in which operations are performed or units of apparatuses responsible for performing operations. Specific steps and units may be implemented by dedicated circuitry, programmable circuitry supplied with computer-readable instructions stored on the computer-readable storage medium, and/or processors supplied with computer-readable instructions stored on the computer-readable storage medium. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), and the like.

The computer-readable storage medium may include any tangible device that can store instructions for execution by a suitable device, such that the computer-readable storage medium having instructions stored therein comprises an article of manufacture including instructions which can be executed to create means for performing operations specified in the flow charts or block diagrams. Examples of the computer-readable storage medium may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to create means for performing operations specified in the flow charts or block diagrams. Examples of processors include computer processors, processing units, microprocessors, digital signal processors, controllers, microcontrollers, etc.

The above embodiments have been described exemplifying the vehicle 200 as an example of the mobile relaying apparatus, but is not limited thereto. An unmanned aircraft etc. like a drone may be adopted as a mobile relaying apparatus.

While the present invention has been described using the embodiments, the technical scope of the invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the invention.

Each process of the operations, procedures, steps, stages, and the like performed by an apparatus, system, program, and method shown in the claims, the specification, and drawings can be performed in any order as long as the order is not indicated by "prior to," "before," or the like and as long as the output from a previous process is not used in a later process. Even if the process flow is described using phrases such as "first" or "next" in the claims, the specification, and drawings, it does not necessarily mean that the process must be performed in this order.

EXPLANATION OF REFERENCE SYMBOLS

10: communication system, 20: network, 100: wireless base station, 102: cell, 112: receiving-intensity acquiring unit, 114: moving-information acquiring unit, 116: relative-speed acquiring unit, 118: determination unit, 122: HO controlling unit, 124: CA controlling unit, 130: route-information acquiring unit, 200, 260, 270: vehicle, 202, 262, 272: cell, 210: in-vehicle device, 212: receiving-intensity acquiring unit, 214: moving-information acquiring unit, 216: relative-speed acquiring unit, 218: determination unit, 222: HO controlling unit, 224: CA controlling unit, 230: route-information acquiring unit, 300: wireless communication terminal, 302: connection establishing unit, 304: receiving-intensity measuring unit, 306: moving-information acquiring unit, 308: measurement-report transmitting unit, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, 1240: input/output chip

What is claimed is:

1. A control device comprising:
   a relative-speed acquiring unit for acquiring relative speeds of a movable first mobile relaying apparatus and a movable second mobile relaying apparatus, which are camped on a cell of a wireless base station to relay communications between the wireless base station and a wireless communication terminal;
   a determination unit for determining, based on the relative speeds, whether the second mobile relaying apparatus becomes a handover destination, from the first mobile relaying apparatus, of the wireless communication terminal camped on the first mobile relaying apparatus, or becomes a carrier-aggregation destination of the first mobile relaying apparatus for the wireless communication terminal camped on the first mobile relaying apparatus, wherein the determination unit determines the second mobile relaying apparatus as the handover destination or the carrier-aggregation destination, when the relative speeds are slower than a predetermined threshold.

2. The control device according to claim 1, wherein the determination unit determines the second mobile relaying apparatus as the handover destination or the carrier-aggregation destination, when the relative speeds are slower than the predetermined threshold and when a relative speed between the wireless communication terminal camped on the first mobile relaying apparatus and the second mobile relaying apparatus is slower than a predetermined threshold.

3. The control device according to claim 1, further comprising:
an HO controlling unit for controlling such that a handover destination of the wireless communication terminal camped on the first mobile relaying apparatus becomes the second mobile relaying apparatus, when the determination unit determines the second mobile relaying apparatus as the handover destination.

4. The control device according to claim 3, wherein the HO controlling unit controls such that the wireless communication terminal camped on the first mobile relaying apparatus is handovered to the second mobile relaying apparatus, by including the second mobile relaying apparatus into a neighboring-cell list, which is transmitted for the wireless communication terminal camped on the first mobile relaying apparatus by the first mobile relaying apparatus.

5. The control device according to claim 1, further comprising:
a CA controlling unit for performing control such that the first mobile relaying apparatus registers the second mobile relaying apparatus as a carrier-aggregation destination, when the determination unit determines the second mobile relaying apparatus as the carrier-aggregation destination.

6. The control device according to claim 1, wherein
the relative-speed acquiring unit acquires relative speeds between the first mobile relaying apparatus and each of a plurality of mobile relaying apparatuses, and
the determination unit determines a handover destination, from the first mobile relaying apparatus, of the wireless communication terminal camped on the first mobile relaying apparatus, or determines a carrier-aggregation destination of the first mobile relaying apparatus for the wireless communication terminal camped on the first mobile relaying apparatus, from among mobile relaying apparatuses, in the plurality of mobile relaying apparatuses, whose relative speed to the first mobile relaying apparatus is slower than a predetermined threshold.

7. The control device according to claim 6, wherein
each of the first mobile relaying apparatus and the plurality of mobile relaying apparatuses is mounted on a vehicle;
the control device comprises a route-information acquiring unit for acquiring route information indicating each planned moving route of a plurality of vehicles that mount each of the first mobile relaying apparatus and the plurality of mobile relaying apparatuses; and
the determination unit determines, as the handover destination or the carrier-aggregation destination, a mobile relaying apparatus whose planned moving route is in a higher degree of coincidence with a planned moving route of the first mobile relaying apparatus, among mobile relaying apparatuses whose relative speed to the first mobile relaying apparatus are slower than the predetermined threshold.

8. The control device according to claim 1, wherein
the control device is the wireless base station; and
the control device comprises a controlling unit for controlling the first mobile relaying apparatus such that the second mobile relaying apparatus becomes the handover destination or the carrier-aggregation destination of the second mobile relaying apparatus, by informing the first mobile relaying apparatus that the second mobile relaying apparatus is determined as the handover destination or the carrier-aggregation destination, when the determination unit determines the second mobile relaying apparatus as the handover destination or the carrier-aggregation destination.

9. The control device according to claim 1, wherein the control device is mounted in the first mobile relaying apparatus.

10. A communication system comprising:
a control device according to claim 9; and
a wireless communication terminal; wherein
the wireless communication terminal comprising:
a connection establishing unit for establishing a wireless communication connection with a first mobile relaying apparatus; and
a measurement-report transmitting unit for including the relative speed into a measurement report, transmitted to the first mobile relaying apparatus, of radio waves that the wireless communication terminal is receiving, to transmit the measurement report, when a moving speed of the first mobile relaying apparatus and relative speeds to other mobile relaying apparatus other than the first mobile relaying apparatus are slower than a predetermined speed; and
the relative-speed acquiring unit acquires the relative speed included in the measurement report.

11. A non-transitory computer-readable storage medium comprising a program stored thereon, the program causing a computer to function as:
a relative-speed acquiring unit for acquiring relative speeds of a movable first mobile relaying apparatus and a movable second mobile relaying apparatus, which are camped on a cell of a wireless base station to relay communications between the wireless base station and a wireless communication terminal; and
a determination unit for determining, based on the relative speeds, whether the second mobile relaying apparatus becomes a handover destination, from the first mobile relaying apparatus, of the wireless communication terminal camped on the first mobile relaying apparatus, or becomes a carrier-aggregation destination of the first mobile relaying apparatus for the wireless communication terminal camped on the first mobile relaying apparatus, wherein the determination unit determines the second mobile relaying apparatus as the handover destination or the carrier-aggregation destination, when the relative speeds are slower than a predetermined threshold.

12. A control method performed by a computer, the control method comprising:
acquiring relative speeds of a movable first mobile relaying apparatus and a movable second mobile relaying apparatus, which are camped on a cell of a wireless base station to relay communications between the wireless base station and a wireless communication terminal; and determining, based on the relative speeds, whether the second mobile relaying apparatus becomes a handover destination, from the first mobile relaying apparatus, of the wireless communication terminal camped on the first mobile relaying apparatus, or becomes a carrier-aggregation destination of the first mobile relaying apparatus for the wireless communication terminal camped on the first mobile relaying apparatus, wherein the determining includes determining the second mobile relaying apparatus as the handover destination or the carrier-aggregation destination, when the relative speeds are slower than a predetermined threshold.

* * * * *